US012323170B2

(12) United States Patent
Feng

(10) Patent No.: US 12,323,170 B2
(45) Date of Patent: Jun. 3, 2025

(54) RADIO-FREQUENCY PA MID DEVICE, RADIO-FREQUENCY SYSTEM AND COMMUNICATION DEVICE

(71) Applicant: GUANGDONG OPPO MOBILE TELECOMMUNICATIONS CORP., LTD., Dongguan (CN)

(72) Inventor: Bin Feng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 408 days.

(21) Appl. No.: 18/075,149

(22) Filed: Dec. 5, 2022

(65) Prior Publication Data

US 2023/0119087 A1    Apr. 20, 2023

Related U.S. Application Data

(63) Continuation of application No. PCT/CN2021/091414, filed on Apr. 30, 2021.

(30) Foreign Application Priority Data

Jun. 23, 2020   (CN) .......................... 202010582296.8

(51) Int. Cl.
*H04B 1/00* (2006.01)
*H04B 1/04* (2006.01)

(52) U.S. Cl.
CPC ......... *H04B 1/0078* (2013.01); *H04B 1/0057* (2013.01); *H04B 1/0458* (2013.01); *H04B 2001/0408* (2013.01)

(58) Field of Classification Search
CPC .. H04B 1/0078; H04B 1/0057; H04B 1/0458; H04B 2001/0408; H04B 1/44; H04B 1/40; H04B 1/18

(Continued)

(56) References Cited

U.S. PATENT DOCUMENTS

2017/0257135 A1    9/2017   Solomko et al.
2018/0331715 A1*  11/2018   Xu .......................... H04B 1/00
(Continued)

FOREIGN PATENT DOCUMENTS

CN    105375946 A    3/2016
CN    106603165 A    4/2017
(Continued)

OTHER PUBLICATIONS

International Search Report and Written Opinion dated Jul. 26, 2021 in International Application No. PCT/CN2021/091414. English translation attached.

(Continued)

*Primary Examiner* — Tanmay K Shah
(74) *Attorney, Agent, or Firm* — Sheppard, Mullin, Richter & Hampton LLP

(57) ABSTRACT

Provided is a radio-frequency Power Amplifier Modules including Duplexers (PA Mid) device. The radio-frequency PA Mid device has a coupling output port (CPLOUT), a coupling input port (CPLIN), and an antenna port (ANT). The radio-frequency PA Mid device includes: a transceiving circuit (110) configured to support transceiving control of a radio-frequency signal; a coupling unit (120) including an input port (a), an output port (b), a first coupling port (c) configured to couple the radio-frequency signal and output a forward coupled signal, and a second coupling port (d) configured to couple a reflected signal of the radio-frequency signal and output a reverse coupled signal; and a coupling switch (130) configured to selectively output, via the coupling output port (CPLOUT), the forward coupled signal, the reverse coupled signal, or an external coupled signal received via the coupling input port (CPLIN).

18 Claims, 12 Drawing Sheets

(58) Field of Classification Search
USPC .................................................... 455/552.1
See application file for complete search history.

(56) References Cited

U.S. PATENT DOCUMENTS

| | | | |
|---|---|---|---|
| 2019/0123769 A1* | 4/2019 | Pehlke | H04B 7/08 |
| 2019/0140672 A1* | 5/2019 | Ping | H04B 1/0483 |
| 2020/0014429 A1* | 1/2020 | Leung | H04B 1/0483 |

FOREIGN PATENT DOCUMENTS

| | | | |
|---|---|---|---|
| CN | 109565292 A | 4/2019 | |
| CN | 110708089 A | 1/2020 | |
| CN | 110768634 A | 2/2020 | |
| EP | 3148263 A1 | 3/2017 | |
| WO | 2020019124 A1 | 1/2020 | |

OTHER PUBLICATIONS

Sprint Corporation. "Band 41 HPUE feasibility measurements using APT mode", 3GPP TSG-RAN WG4#77 R4-158075, Nov. 20, 2015 (Nov. 20, 2015), entire document.

The First Office Action from corresponding Chinese Application No. 202010582296.8, dated Apr. 14, 2022. English translation attached.

The Grant Notice from corresponding Chinese Application No. 202010582296.8, dated Aug. 3, 2022. English translation attached.

Extended European Search Report dated Oct. 10, 2023 with Communication pursuant to Rules 70(2) and 70a(2) EPC mailed Oct. 27, 2023 received in European Patent Application No. EP21828479.2.

* cited by examiner

US 12,323,170 B2

RADIO-FREQUENCY PA MID DEVICE, RADIO-FREQUENCY SYSTEM AND COMMUNICATION DEVICE

CROSS-REFERENCE TO RELATED APPLICATION

The present application a continuation of International Application No. PCT/CN2021/091414, filed on Apr. 30, 2021, which claims a priority to Chinese Patent Application No. 202010582296.8, entitled "RADIO-FREQUENCY PA MID DEVICE, RADIO-FREQUENCY SYSTEM, AND COMMUNICATION DEVICE", filed with China National Intellectual Property Administration on Jun. 23, 2020. The disclosures of the aforementioned applications are hereby incorporated by reference in their entireties.

FIELD

The present disclosure relates to the field of radio-frequency technologies, and more particularly, to a radio-frequency Power Amplifier Modules including Duplexers (PA Mid) device, a radio-frequency system, and a communication apparatus.

BACKGROUND

The statements here provide only background information relevant to the present disclosure and do not necessarily constitute example related art.

With the development and advancement of technology, 5-th Generation (5G) mobile communication technology has been increasingly applied to electronic devices. Compared with 4G mobile communication technology, 5G mobile communication technology has a higher communication frequency. Generally, a plurality of switches may be disposed in a feedback detection channel in a radio-frequency system to support coupling switching control of a plurality of radio-frequency signals, in order to achieve power detection of different coupled signals.

SUMMARY

Embodiments of the present disclosure provide a radio-frequency PA Mid device, a radio-frequency system, and a communication apparatus.

The radio-frequency PA Mid device has a coupling output port, a coupling input port, and an antenna port configured to connect to an antenna. The radio-frequency PA Mid device includes a transceiving circuit, a coupling unit, and a coupling switch. The transceiving circuit is connected to the antenna port and configured to support transceiving control of a radio-frequency signal. The coupling unit includes an input port coupled to the transceiving circuit, an output port coupled to the antenna port, a first coupling port configured to couple the radio-frequency signal and output a forward coupled signal, and a second coupling port configured to couple a reflected signal of the radio-frequency signal and output a reverse coupled signal. The coupling switch is connected to the first coupling port, the second coupling port, the coupling output port, and the coupling input port. The coupling switch is configured to selectively output, via the coupling output port, the forward coupled signal, the reverse coupled signal, or an external coupled signal received via the coupling input port.

The radio-frequency system includes a radio-frequency transceiver, a plurality of cascaded radio-frequency PA Mid devices, and a plurality of antennas. Each of the plurality of radio-frequency PA Mid devices is the radio-frequency PA Mid device as described above. Radio-frequency signals transceived by at least two of the plurality of radio-frequency PA Mid devices are in different frequency bands. The coupling output port of the radio-frequency PA Mid device of a lower stage is connected to the coupling input port of the radio-frequency PA Mid device of an immediately upper stage. The coupling input port of the radio-frequency PA Mid device of an uppermost stage is connected to the radio-frequency transceiver. The plurality of antennas are connected to the antenna ports of the plurality of radio-frequency PA Mid devices in a one-to-one correspondence. The plurality of antennas are configured to transceive radio-frequency signals in a plurality of different operating frequency bands.

The communication apparatus includes the radio-frequency system as described above.

Details of one or more embodiments of the present disclosure are presented in the accompanying drawings and description below. Other features, objects, and advantages of the present disclosure will become apparent from the specification, the accompanying drawings, and the claims.

BRIEF DESCRIPTION OF THE DRAWINGS

In order to clearly explain technical solutions according to the embodiments of the present disclosure or in the related art, drawings used in the description of the embodiments or the related art are briefly described below. Obviously, the drawings described below are merely some embodiments of the present disclosure. Based on these drawings, other drawings can be obtained by those skilled in the art without creative effort.

FIG. 9B is a schematic diagram of a packaging of a radio-frequency PA Mid device in

FIG. 9A.

DETAILED DESCRIPTION

In order to facilitate understanding of the present disclosure and to clarify the above-mentioned objects, features, and advantages of the present disclosure, specific embodiments of the present disclosure are described in detail below in conjunction with the accompanying drawings. In the following description, many specific details are provided to facilitate full understanding of the present disclosure. Preferred embodiments of the present disclosure are illustrated by means of the accompanying drawings. However, the present disclosure can be implemented in various forms and is not limited to the embodiments described herein. On the contrary, these embodiments are merely provided to facilitate thorough and comprehensive understanding of the content of the present disclosure. The present disclosure can be implemented in various manners other than those described herein, and similar improvements can be made by those skilled in the art without contradicting the intent of the present disclosure. Therefore, the present disclosure is not limited by specific embodiments disclosed below.

In addition, the term "first" or "second" is only for descriptive purposes, and it cannot be indicating or implying relative importance or implicitly indicating the number of indicated technical features. Therefore, the features defined with "first" or "second" can explicitly or implicitly include at least one of the features. In the description of the present disclosure, "plurality of" means at least two, unless otherwise specifically indicated. In the present disclosure, "a number of" means at least one, unless otherwise specifically indicated.

A radio-frequency system involved in the embodiments of the present disclosure can be applied to a communication apparatus having a wireless communication function. The communication apparatus may be a handheld device, a vehicle-mounted device, a wearable device, a computing device or other processing devices connected to a wireless modem, various forms of User Equipment (UE) (e.g., mobile phones), Mobile Stations (MS), etc. For ease of description, the above-mentioned devices are collectively referred to as the communication apparatus.

Figure 1:
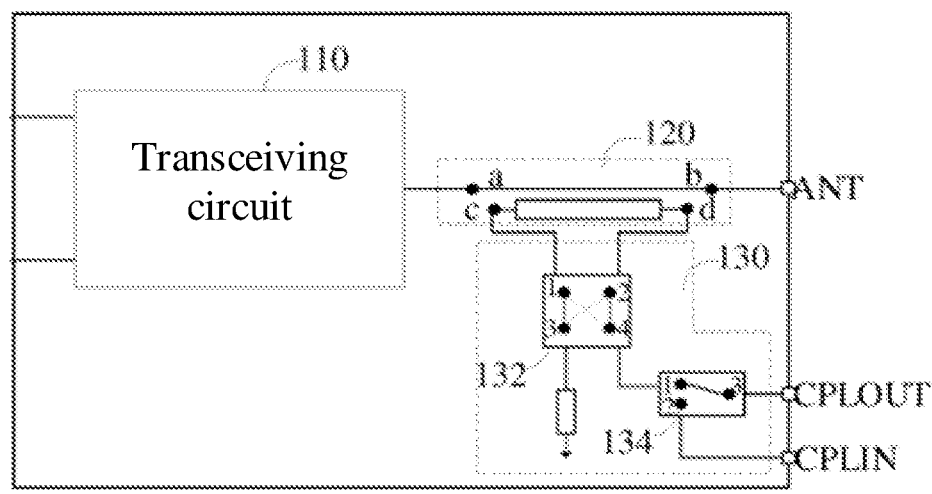
FIG. 1 is a first schematic structural diagram of a radio-frequency PA Mid device according to an embodiment.
Figure 2:
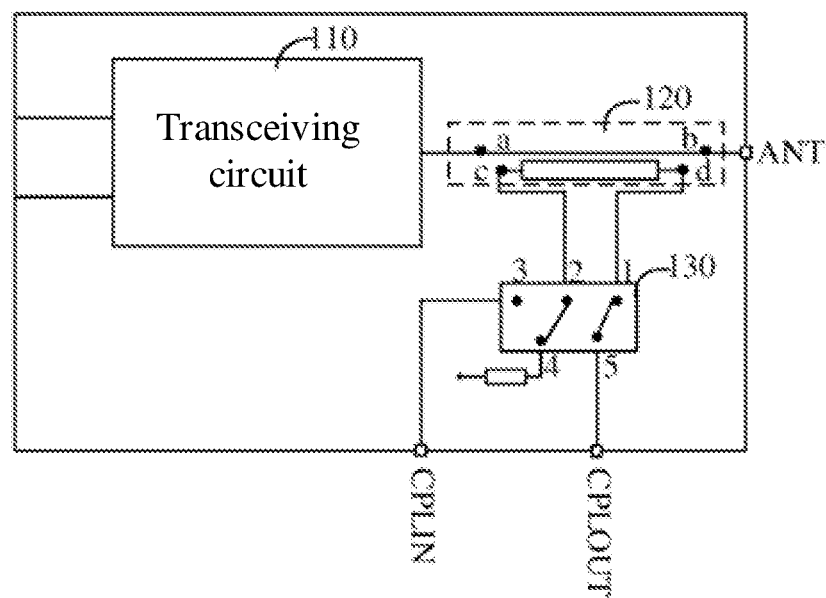
FIG. 2 is a second schematic structural diagram of a radio-frequency PA Mid device according to an embodiment.

As illustrated in FIG. 1 and FIG. 2, embodiments of the present disclosure provide a radio-frequency PA Mid device. In an embodiment, the radio-frequency PA Mid device is configured to transmit a single band radio-frequency signal, and the radio-frequency PA Mid device can couple the transmitted radio-frequency signal to selectively output a coupled signal of the radio-frequency signal. The coupled signal includes a forward coupled signal and a reverse coupled signal. Forward power of the radio-frequency signal may be detected based on the forward coupled signal. Reverse power of a reflected signal of the radio-frequency signal can be detected based on the reverse coupled signal.

As an example, the radio-frequency PA Mid device has a coupling output port CPLOUT, a coupling input port CPLIN, and an antenna port ANT configured to connect to an antenna. The coupling output port CPLOUT is configured to output a coupled signal of the radio-frequency PA Mid device. The coupling input port CPLIN is configured to receive an external coupled signal outputted by an external radio-frequency PA Mid device and to output the received external coupled signal to a radio-frequency transceiver via the coupling output port CPLOUT.

In an embodiment, the radio-frequency PA Mid device can be interpreted as a packaged chip. A transceiving circuit 110, a coupling unit 120, and a coupling switch 130 included in the radio-frequency PA Mid device are all integrated in the same packaged chip. The coupling output port CPLOUT, the coupling input port CPLIN, and the antenna port ANT can be interpreted as radio-frequency pins provided in the radio-frequency PA Mid device and connected to other modules.

The transceiving circuit 110 is configured to support transceiving of radio-frequency signals. As an example, the transceiving circuit 110 may receive a radio-frequency signal transmitted by the radio-frequency transceiver, perform a filtering processing on and amplify the received radio-frequency signal, and output the filtering-processed and amplified radio-frequency signal to an antenna via the antenna port ANT, thereby realizing a transmission control of the radio-frequency signal. Accordingly, the transceiving circuit 110 may also receive the radio-frequency signal via the antenna port ANT, perform a filtering processing on and amplify the received radio-frequency signal, and transmit the filtering-processed and amplified radio-frequency signal to the radio-frequency transceiver, thereby realizing a receiving control of the radio-frequency signal.

In an embodiment, the radio-frequency signal may be a 5G New Radio (NR) signal. For example, the radio-frequency signal may be a 5G signal in an operating frequency band of N41, N77 (including N78), or N79. As an example, an operating frequency band of N41 ranges from 2,496 MHz to 2,690 MHz; an operating frequency band of N77 ranges from 3,300 MHz to 4,200 MHz; an operating frequency band of N78 ranges from 3,300 MHz to 3,800 MHz; and an operating frequency band of N79 ranges from 4,400 MHz to 5,000 MHz. That is, the radio-frequency PA Mid device according to the embodiments of the present disclosure can support the transceiving control of 5G signals in the operating frequency band of N41, N77 (including N78), or N79.

The coupling unit 120 is disposed between the transceiving circuit 110 and the antenna port ANT. It should also be understood that the coupling unit 120 may be disposed in a transmitting path of the radio-frequency signal to couple the radio-frequency signal, thereby coupling-output the coupled signal. As an example, the coupling unit 120 includes an input port a, an output port b, a first coupling port c, and a second coupling port d. In addition, the coupling unit 120 further includes a primary line extending between the input port a and the output port b and a secondary line extending between the first coupling port c and the second coupling port d.

The input port a is coupled to the transceiving circuit 110 and configured to couple and receive the radio-frequency signal processed by the transceiving circuit 110. The output port b is coupled to the antenna port ANT and configured to couple and output the radio-frequency signal to the antenna. The first coupling port c is configured to couple the radio-frequency signal received at the input port a and output a forward coupled signal. The second coupling port d is configured to couple a reflected signal of the radio-frequency signal and output a reverse coupled signal. Forward power of the radio-frequency signal can be detected based on the forward coupled signal outputted by the first coupling port c. Reverse power of the radio-frequency signal can be detected correspondingly based on the reverse coupled signal outputted by the second coupling port d.

It should be noted that in the embodiments of the present disclosure, the first coupling port c may be referred to as a forward power output port b, and the second coupling port d may be referred to as a reverse power output port b.

The coupling switch 130 is connected to the first coupling port c, the second coupling port d, the coupling output port CPLOUT, and the coupling input port CPLIN. The coupling switch 130 is configured to selectively output, via the coupling output port CPLOUT, the forward coupled signal, the reverse coupled signal, or an external coupled signal received via the coupling input port CPLIN. That is, by controlling the coupling switch 130, the forward coupled signal may be selected to be outputted via the coupling output port CPLOUT to detect the forward power of the radio-frequency signal, and in this case, such a detection mode is defined as a forward power detection mode; or the reverse coupled signal may be selected to be outputted via the coupling output port CPLOUT to detect the reverse power of the radio-frequency signal, and in this case, such a detection mode is defined as a reverse power detection mode; or the external coupled signal of the external radio-frequency PA Mid device may be received via the coupling input port CPLIN, and the received external coupled signal may be selected to be outputted via the coupling output port CPLOUT to detect power information of the external radio-frequency signal, and in this case, such a detection mode is defined as an external power detection mode. The external coupled signal may also include an external forward coupled signal and an external reverse coupled signal. The external power detection modes may be categorized into an external forward power detection mode and an external reverse power detection mode according to the external coupled signal. That is, the coupling switch 130 is configured to switch among the forward power detection mode, the reverse power detection mode, and the external power detection mode.

By providing the coupling input port CPLIN and the coupling output port CPLOUT in the radio-frequency PA Mid device, in combination with the coupling unit 120 and the coupling switch 130, the external coupled signal can be transmitted to the radio-frequency transceiver via the coupling input port CPLIN and the coupling output port CPLOUT of the radio-frequency PA Mid device sequentially. In this way, it is unnecessary to additionally provide an external switch for the radio-frequency PA Mid device and the radio-frequency transceiver, thereby saving space and reducing costs. The external switch is configured to selectively transmit a coupled signal coupled and outputted by the radio-frequency PA Mid device itself, and an external coupled signal from the external radio-frequency PA Mid device. In the meantime, a wiring length of a feedback detection channel between each radio-frequency PA Mid device and the radio-frequency transceiver can be shortened, and thus the complexity of PB layout and wiring can be lowered. In addition, isolation between feedback detection channels can be increased to reduce mutual interference between the feedback detection channels.

Referring to FIG. 1, in an embodiment, the coupling switch 130 includes a first switching unit 132 and a second switching unit 134. The first switching unit 132 is connected to the first coupling port c, the second coupling port d, and a ground terminal. The second switching unit 134 is connected to the first switching unit 132, the coupling input port CPLIN, and the coupling output port CPLOUT.

In an embodiment, the first switching unit 132 is a radio-frequency Double Pole Double Throw (DPDT) switch, and the second switching unit 134 is a radio-frequency Single Pole Double Throw (SPDT) switch. The radio-frequency DPDT switch includes four contacts, and the radio-frequency SPDT switch includes three contacts. A first contact (1) of the radio-frequency DPDT switch is connected to the first coupling port c of the coupling unit 120. A second contact (2) of the radio-frequency DPDT switch is connected to the second coupling port d of the coupling unit 120. A third contact (3) of the radio-frequency DPDT switch is grounded. A fourth contact (4) of the radio-frequency DPDT switch is connected to a first contact (1) of the radio-frequency SPDT switch. A second contact (2) of the radio-frequency SPDT switch is connected to the coupling input port CPLIN. A third contact (3) of the radio-frequency SPDT switch is connected to the coupling output port CPLOUT. The first contact (1) and the second contact (2) of the radio-frequency SPDT switch can be interpreted as moving ends of the radio-frequency SPDT switch. The third contact (3) of the radio-frequency SPDT switch can be interpreted as a stationary end of the radio-frequency SPDT switch.

Operating principles of the coupling unit 120 are described by an example of the coupling switch 130 including the radio-frequency DPDT switch and the radio-frequency SPDT switch.

When the reverse power of the radio-frequency signal is to be detected, the fourth contact (4) and the second contact (2) of the radio-frequency DPDT switch are in a conductive connection, and the third contact (3) and the first contact (1) of the radio-frequency DPDT switch are in a conductive connection, such that a leaked forward coupled signal can be grounded to avoid interference with the reverse power output port b; further, the third contact (3) and the second contact (2) of the radio-frequency SPDT switch are in a conductive connection to transmit the reverse coupled signal to the coupling output port CPLOUT, thereby completing the detection of the reverse power of the radio-frequency signal.

When the forward power of the radio-frequency signal is to be detected, the fourth contact (4) and the first contact (1) of the radio-frequency DPDT switch are in a conductive connection, and the third contact (3) and the second contact (2) of the radio-frequency DPDT switch are in a conductive connection, such that a leaked reverse coupled signal can be grounded to avoid interference caused by the reverse power output port b; and further, the third contact (3) and the second contact (2) of the radio-frequency SPDT switch are in a conductive connection to transmit the forward coupled signal to the coupling output port CPLOUT, thereby realizing the detection of the forward power of the radio-frequency signal.

When the power of the external radio-frequency signal is to be detected, the third contact (3) and the first contact (1) of the radio-frequency SPDT switch are in a conductive connection to transmit the external coupled signal received via the coupling input port CPLIN to the coupling output port CPLOUT, thereby realizing the detection of the power of the external radio-frequency signal.

Referring to FIG. 2, in an embodiment, the coupling switch 130 includes a plurality of first terminals and two second terminals. In the plurality of first terminals, one first terminal is connected to the first coupling port c; another first terminal is connected to the second coupling port d; yet another first terminal is connected to the coupling input port CPLIN. One second terminal of the two second terminals is connected to the coupling output port CPLOUT, and the other second terminal is grounded. In an embodiment, the coupling switch 130 is a radio-frequency Double Pole Five Throw (DP5T) switch. As an example, one first terminal (contact 1) of the radio-frequency DP5T switch is connected to the first coupling port c; another first terminal (contact 2) of the radio-frequency DP5T switch is connected to the second coupling port d; yet another first terminal (contact 3) of the radio-frequency DP5T switch is connected to the coupling input port CPLIN; one second terminal (contact 4) of the radio-frequency DP5T switch is connected to the coupling output port CPLOUT; and the other second terminal (contact 5) of the radio-frequency DP5T switch is grounded.

Operating principles of the coupling unit 120 are described by an example of the coupling switch 130 including the radio-frequency DP5T switch.

When the reverse power of the radio-frequency signal is to be detected, one second terminal (contact 5) and one first terminal (contact 1) of the radio-frequency DP5T switch are in a conductive connection, and the other one second terminal (contact 4) and another first terminal (contact 2) of the radio-frequency DP5T switch are in a conductive connection. In this way, the reverse coupled signal can be transmitted to the coupling output port CPLOUT to detect the reverse power of the radio-frequency signal, and meanwhile, the leaked forward coupled signal can be grounded to avoid interference with the forward power output port b.

When the forward power of the radio-frequency signal is to be detected, one second terminal (contact 4) and one first terminal (contact 2) of the radio-frequency DP5T switch are in a conductive connection, and the other second terminal (contact 5) and another one first terminal (contact 1) of the radio-frequency DP5T switch are in a conductive connection. In this way, the forward coupled signal can be transmitted to the coupling output port CPLOUT to detect the forward power of the radio-frequency signal, and meanwhile, the leaked reverse coupled signal can be grounded to avoid interference with the forward power output port b.

When the power of the external radio-frequency signal is to be detected, one first terminal (contact 3) and one second terminal (contact 5) of the radio-frequency DP5T switch are in a conductive connection to form a coupling feedback path. The external coupled signal may be received via the coupling input port CPLIN and outputted from the coupling output port CPLOUT, and thus the external coupled signal received via the coupling input port CPLIN can be transmitted to the coupling output port CPLOUT, thereby detecting the power of the external radio-frequency signal.

Comparing with the coupling switch 130 as illustrated in FIG. 1 (e.g., including the radio-frequency DPDT switch and the radio-frequency SPDT switch), the coupling switch 130 as illustrated in FIG. 2 is simplified as the radio-frequency DP5T switch. A number of connection contacts of the radio-frequency DP5T switch can be reduced to five. Thus, a space occupied by the coupling switch 130 can be reduced; isolation between internal components of the radio-frequency PA Mid device can be increased, and a waste of radio-frequency wirings between the components can be lowered. Meanwhile, by combining the radio-frequency DPDT switch and the radio-frequency SPDT switch as the radio-frequency DP5T switch, control logic of the coupling switch 130 can be simplified, avoiding mismatch of logic control of the coupling switch 130 and further improving stability of power detection.

As illustrated in FIG. 1 and FIG. 2, in an embodiment, the radio-frequency PA Mid device further includes a resistor R configured to release the forward coupled signal or the reverse coupled signal. Referring to FIG. 1, the third contact (3) of the radio-frequency DPDT switch is grounded via the resistor R. Referring to FIG. 2, one second terminal (contact 4) of the radio-frequency DP5T switch is grounded via the resistor R. In the reverse power detection mode, the forward coupled signal leaked through the forward power output port b may be grounded via the resistor R, rather than being coupled to the reverse power output port b. Therefore, no interference is brought to the reverse power output port b. In the forward power detection mode, the leaked reverse coupled signal can be grounded via a load to avoid causing interference to the reverse power output port b.

Figure 3:
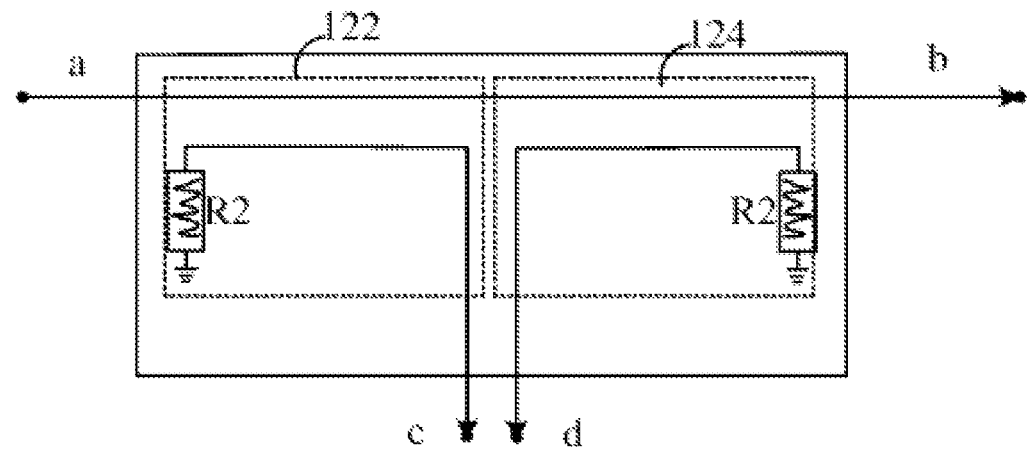
FIG. 3 is a schematic structural diagram of a coupling unit according to an embodiment.

As illustrated in FIG. 3, in an embodiment, the coupling unit 120 includes a first directional coupler 122 and a second directional coupler 124 that are connected in reverse series. The coupler, as a common microwave and millimeter wave component in microwave measurements and other microwave systems, can be used for isolation, separation, and mixing of signals, such as monitoring of power, amplitude stabilization of source output power, signal source isolation, sweep frequency tests of transmissions and reflections, etc. The first directional coupler 122 and the second directional coupler 124 include each a primary line and a secondary line, which are coupled to each other by various forms such as a small hole, a slit, a gap, or the like. The radio-frequency signal reaches an output port b of the primary line after passing through an input port a of the primary line. The power of the radio-frequency signal transmitting through the primary line is partially coupled to the secondary line. Due to wave interference or superposition, the power is transmitted only along one direction of the secondary line (referred to as "forward direction"), and almost no power is transmitted in the opposite direction (referred to as "reverse direction").

As an example, a coupling degree of the directional coupler is 10 dB, a power of the coupling output port CPLOUT is −10 Bm, while a power of the input port a is 0 Bm. Main parameters of a directional coupler of a conventional communication apparatus are shown in the Table. When an output power of a communication transmitter is 26 Bm, 1 Bm signal at a coupling end is transmitted to a feedback detection channel FBRX of a communication setup. A direct output of the directional coupler is 25.8 Bm, while reverse coupling output power leaked to an isolation end is absorbed by a load.

TABLE 1

| Main indicators of a coupler | | | |
|---|---|---|---|
| Coupling degree | Reverse coupling degree | Insertion loss | Maximum input power |
| 25 dB | 25 dB | 0.2 dB | 33 dBm |

When the first directional coupler 122 and the second directional coupler 124 are connected in reverse series, the first directional coupler 122 can be interpreted as a forward coupler, and the second directional coupler 124 can be interpreted as a reverse coupler. The first directional coupler 122 and the second directional coupler 124 may be configured to couple the forward coupled signal and the reverse coupled signal of the outputted radio-frequency signal, respectively. The forward coupled signal is used to detect the forward power of the radio-frequency signal, and the reverse coupled signal is used to detect the reverse power of the radio-frequency signal. As illustrated in FIG. 3, the first directional coupler 122 and the second coupler are connected in reverse series. A coupling end of the first directional coupler 122 is used as the first coupling port c of the coupling unit 120. A coupling end of the second directional coupler 124 is used as the second coupling port d of the coupling unit 120. Isolation ends of the first directional coupler 122 and the second directional coupler 124 are grounded via a communication load. When the forward power of the radio-frequency signal is to be detected, the coupling end of the first directional coupler 122 may be connected to an external wave detector. When the reverse power of the radio-frequency signal is to be detected, the coupling end of the second directional coupler 124 may be connected to an external wave detector.

For example, the first directional coupler 122 and the second directional coupler 124 may also include a shunt resistor. The shunt resistor may serve as the communication load for the first directional coupler 122 and the second directional coupler 124. A resistance of the shunt resistor may be set to 50 ohms. For example, one or more tunable impedance elements, such as a tunable or variable capacitor, inductor, or resistor, may be provided to achieve an adjustable communication load.

It should be noted that, in the embodiments of the present disclosure, a specific form of the coupling unit 120 is not further limited. The coupling unit 120 may also include a bidirectional coupler and a directional coupler, specific forms of which are not limited in the embodiments of the present disclosure.

Figure 4:
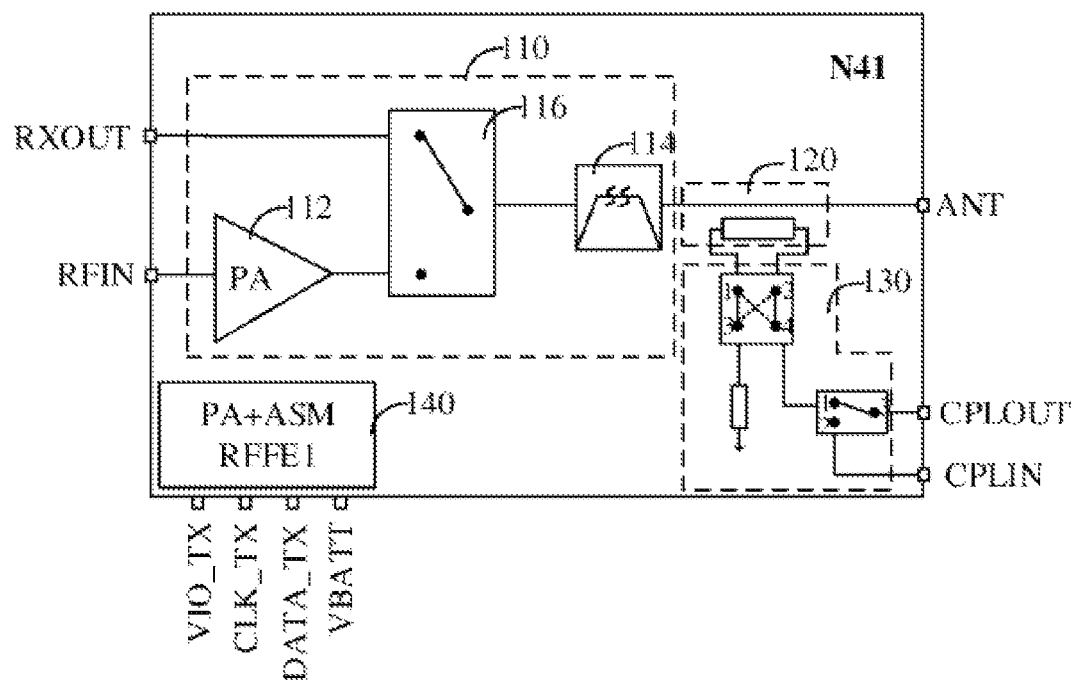
FIG. 4 is a third schematic structural diagram of a radio-frequency PA Mid device according to an embodiment.
Figure 5:
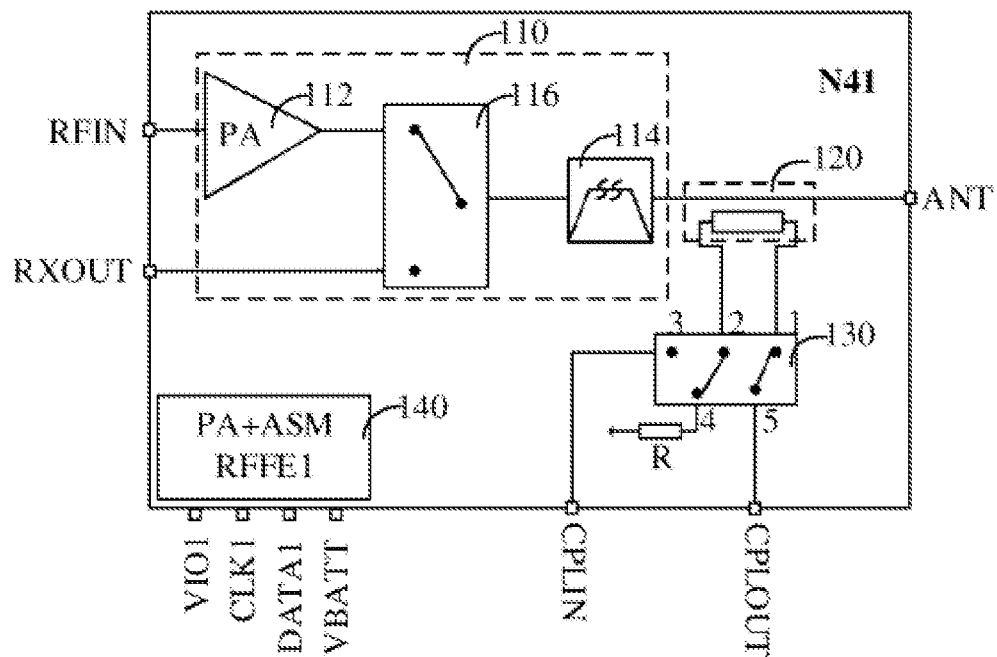
FIG. 5 is a fourth schematic structural diagram of a radio-frequency PA Mid device according to an embodiment.

As illustrated in FIG. 4 and FIG. 5, in an embodiment, the radio-frequency PA Mid device further has a receiving port RXOUT and a transmitting port RFIN. The receiving port RXOUT and the transmitting port RFIN can be interpreted as radio-frequency pins provided in the radio-frequency PA Mid device and configured to connect to other modules.

The transceiving circuit 110 includes a power amplifier 112, a filter 114, and a third switching unit 116. The power amplifier 112 has an input terminal connected to the transmitting port RFIN, and is configured to receive the radio-frequency signal via the transmitting port RFIN and amplify the received radio-frequency signal. The filter 114 is coupled to a first coupling port of the coupling unit 120 and configured to perform a filtering processing the received radio-frequency signal. The third switching unit 116 is connected to an output terminal of the power amplifier 112, the receiving port RXOUT, and the filter 114, and the third switching unit 116 is configured to selectively switch on a receiving channel where the receiving port RXOUT is located and a transmitting channel where the transmitting port RFIN is located.

It should be noted that both the power amplifier 112 and the filter 114 included in the transceiving circuit 110 can be support transceiving of the radio-frequency signal. As an example, the radio-frequency signal is a 5G signal in the N41 frequency band. The power amplifier 112 and the filter 114 can both adapted to signals in the N77 frequency band. That is, signals in the N41 frequency band can be amplified. The filter 114 allows only the signals in the N41 frequency band to pass through, and filters out spurious waves other than the signals in the N41 frequency band.

In an embodiment, the filter 114 may be a band-pass filter 114 or a low-pass filter 114.

In an embodiment, the third switching unit 116 may be a radio-frequency SPDT switch. As an example, the radio-frequency SPDT switch has a first stationary end connected to the output terminal of the power amplifier 112, a second stationary end connected to the receiving port RXOUT, and a moving end connected to the antenna port ANT via the coupling unit 120. The first switching unit 132 is configured to switch a transceiving operating mode in Time-Division Duplex (TDD) system. As an example, when the stationary end of the radio-frequency SPDT switch is controlled to be connected to the power amplifier 112, a transmission control of the radio-frequency signal can be achieved; and when the stationary end of the radio-frequency SPDT switch is controlled to be in a conductive connection with the receiving port RXOUT, a receiving control of the radio-frequency signal can be achieved.

It should be noted that, in the embodiments of the present disclosure, specific forms of the filter 114 and the third switching unit 116 are not further limited.

Figure 6:
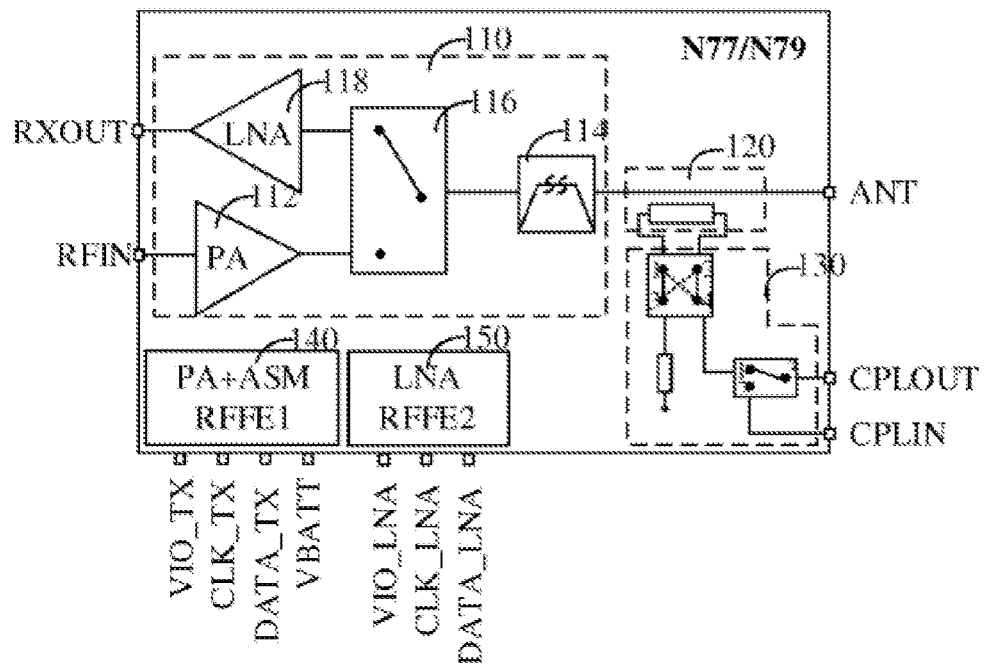
FIG. 6 is a fifth schematic structural diagram of a radio-frequency PA Mid device according to an embodiment.
Figure 7:
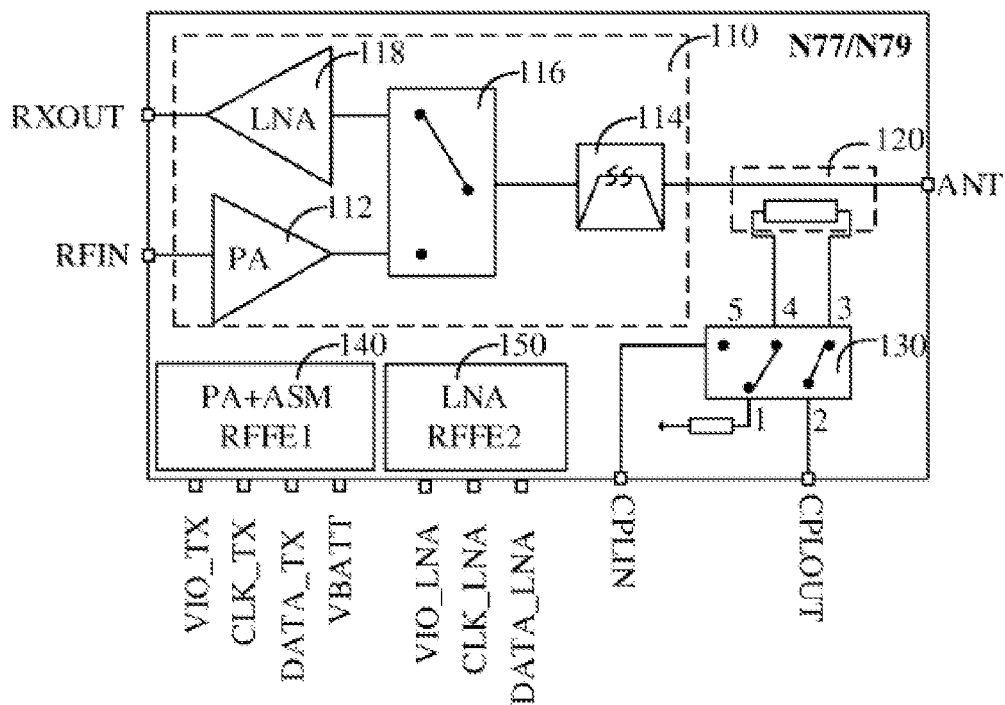
FIG. 7 is a sixth schematic structural diagram of a radio-frequency PA Mid device according to an embodiment.

In an embodiment, as illustrated in FIG. 6 and FIG. 7, the transceiving circuit 110 further includes a low noise amplifier 118, in addition to the power amplifier 112, the filter 114, and the third switching unit 116. The low noise amplifier 118 has an input terminal connected to the third switching unit 116, and an output terminal connected to the receiving port RXOUT. The low noise amplifier 118 is configured to amplify the received radio-frequency signal. That is, the low noise amplifier 118 may be disposed correspondingly in the receiving channel for transmitting the radio-frequency signal. When the low noise amplifier 118 is disposed in the transceiving circuit 110, the radio-frequency PA Mid device can support transceiving control of 5G signals in the N77 or N79 frequency band.

In an embodiment, referring to FIG. 4 and FIG. 5, the radio-frequency PA Mid device further includes a first control unit 140. The first control unit 140 is connected to the power amplifier 112 and the third switching unit 116. The first control unit 140 is configured to control a switching-on or off of the third switching unit 116 and further configured to control an operating state of the power amplifier 112.

In an embodiment, referring to FIG. 6 and FIG. 7, the radio-frequency PA Mid device further includes a second control unit 150. The second control unit 150 is connected to the low noise amplifier 118 and configured to adjust a gain coefficient of the low noise amplifier 118. The low noise amplifier 118 is a gain-adjustable amplifier component. For example, the low noise amplifier 118 has eight gain levels.

For example, the first control unit 140 and the second control unit 150 may be control units of mobile industry processor interface Radio Frequency Front End Control Interface (RFFE), and the control thereof conforms to control protocols of an RFFE bus. When the first control unit 140 and the second control unit 150 are both the RFFE control units, the radio-frequency PA Mid devices further has an input pin CLK for clock signals, an input pin DATA for data signals, reference voltage pin VIO, or the like.

Figure 8A:
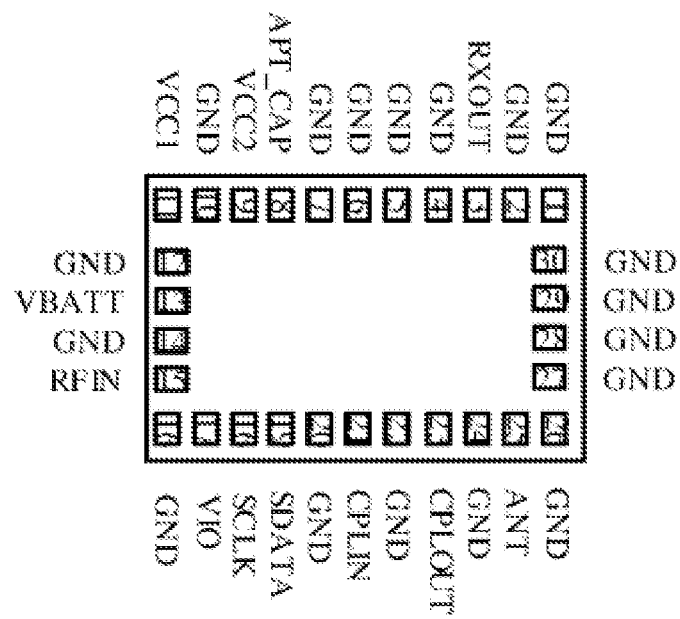
FIG. 8A is a schematic diagram of a pin configuration of a radio-frequency PA Mid device as illustrated in FIG. 5.
Figure 8B:
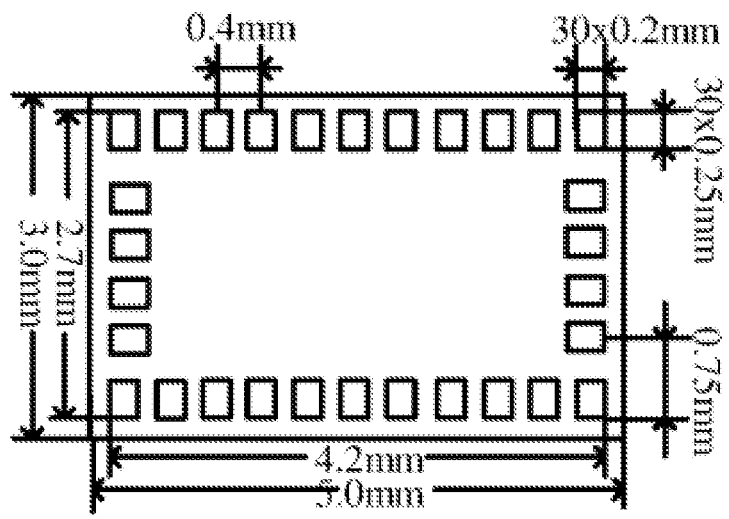
FIG. 8B is a schematic diagram of a packaging of a radio-frequency PA Mid device in FIG. 8A.
Figure 9A:
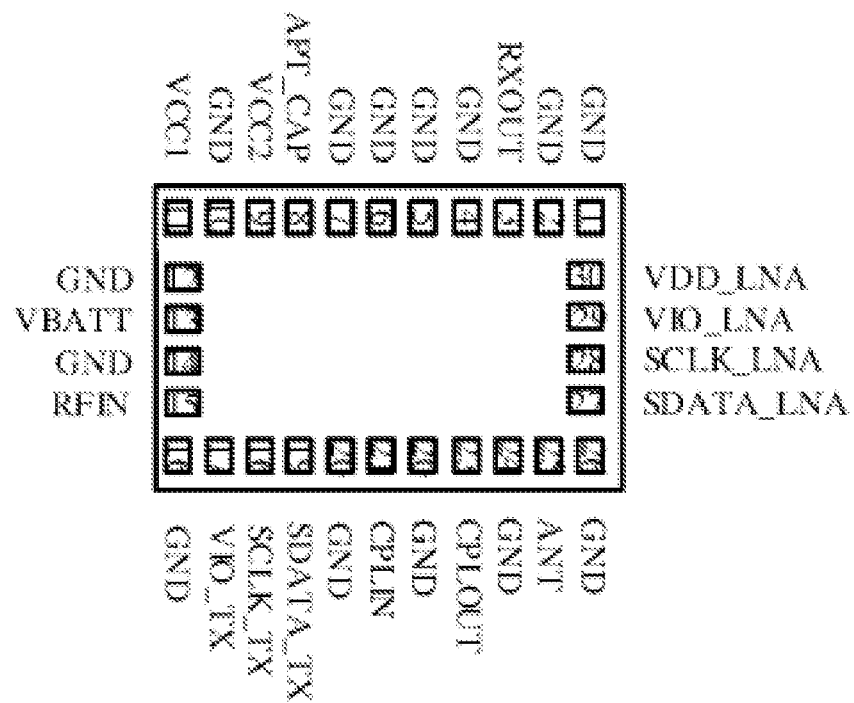
FIG. 9A is a schematic diagram of a pin configuration of a radio-frequency PA Mid device as illustrated in FIG. 6.
Figure 9B:
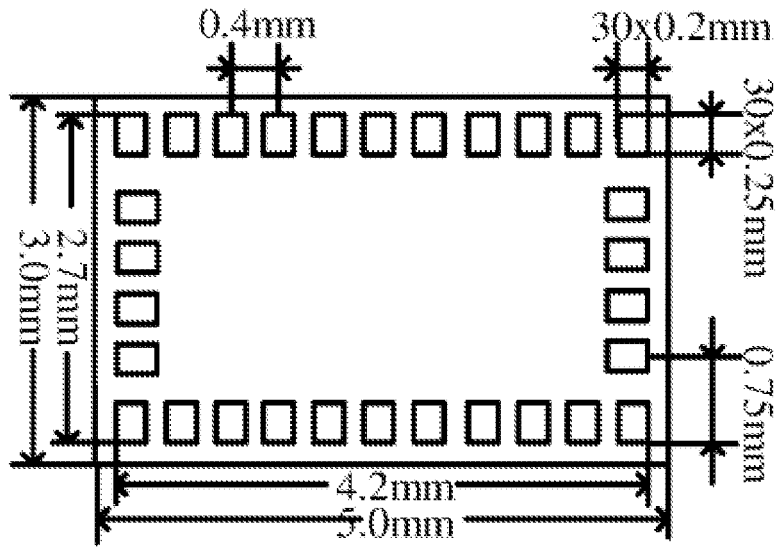
Figure 10A:
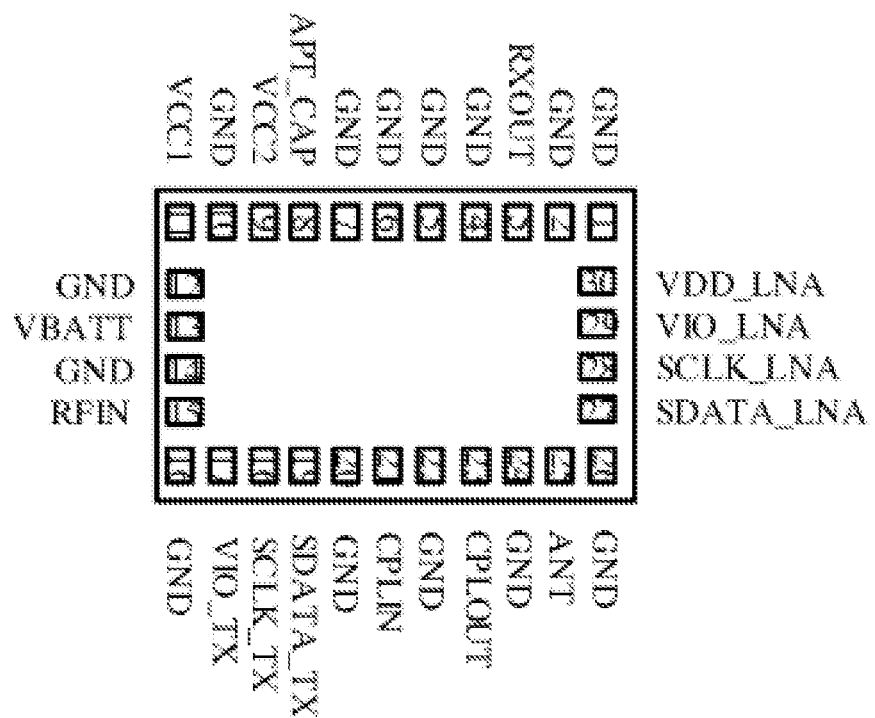
FIG. 10A is a schematic diagram of a pin configuration of a radio-frequency PA Mid device as illustrated in FIG. 7.
Figure 10B:
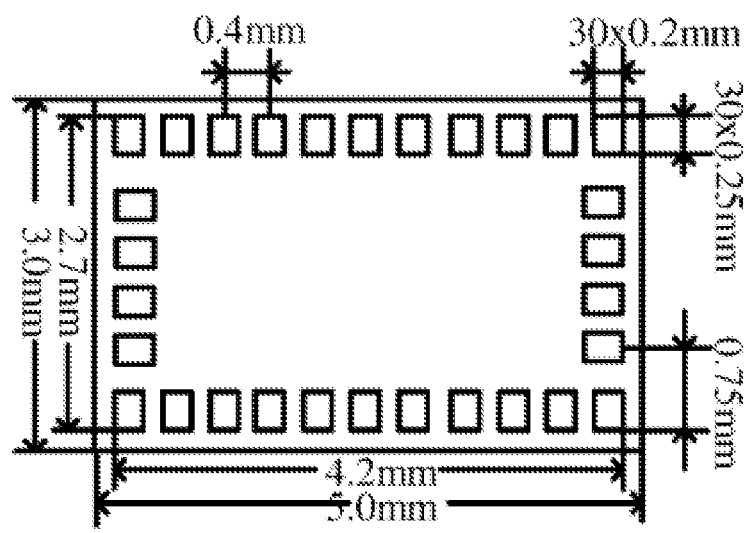
FIG. 10B is a schematic diagram of a packaging of a radio-frequency PA Mid device in FIG. 10A.

In an embodiment, as illustrated in FIG. 5, respective components in the radio-frequency PA Mid device may be integrated and packaged in the same packaged chip, a pin configuration of which is as illustrated in FIG. 8A, and a structure of which is as illustrated in FIG. 8B. As illustrated in FIG. 6, respective components in the radio-frequency PA Mid device may be integrated and packaged in the same packaged chip, a pin configuration of which is as illustrated in FIG. 9A, and a structure of which is as illustrated in FIG. 9B. As illustrated in FIG. 7, respective components in the radio-frequency PA Mid device may be integrated and packaged in the same packaged chip, a pin configuration of which is as illustrated in FIG. 10A, and a structure of which is as illustrated in FIG. 10B. That is, the transceiving circuit 110, the coupling unit 120, and the coupling switch 130 are all integrated and packaged in the same module to constitute a packaged chip. The ports of the radio-frequency PA Mid device are in one-to-one correspondence to the pins of the packaged chip. For example, the antenna port ANT of the radio-frequency PA Mid device corresponds to an antenna pin ANT of the packaged chip.

In the embodiments of the present disclosure, by packaging the respective components of the radio-frequency PA Mid device in the same chip, integration level can be increased, and a space occupied by the respective components can be reduced, conducive to the miniaturization of the device.

Figure 11:
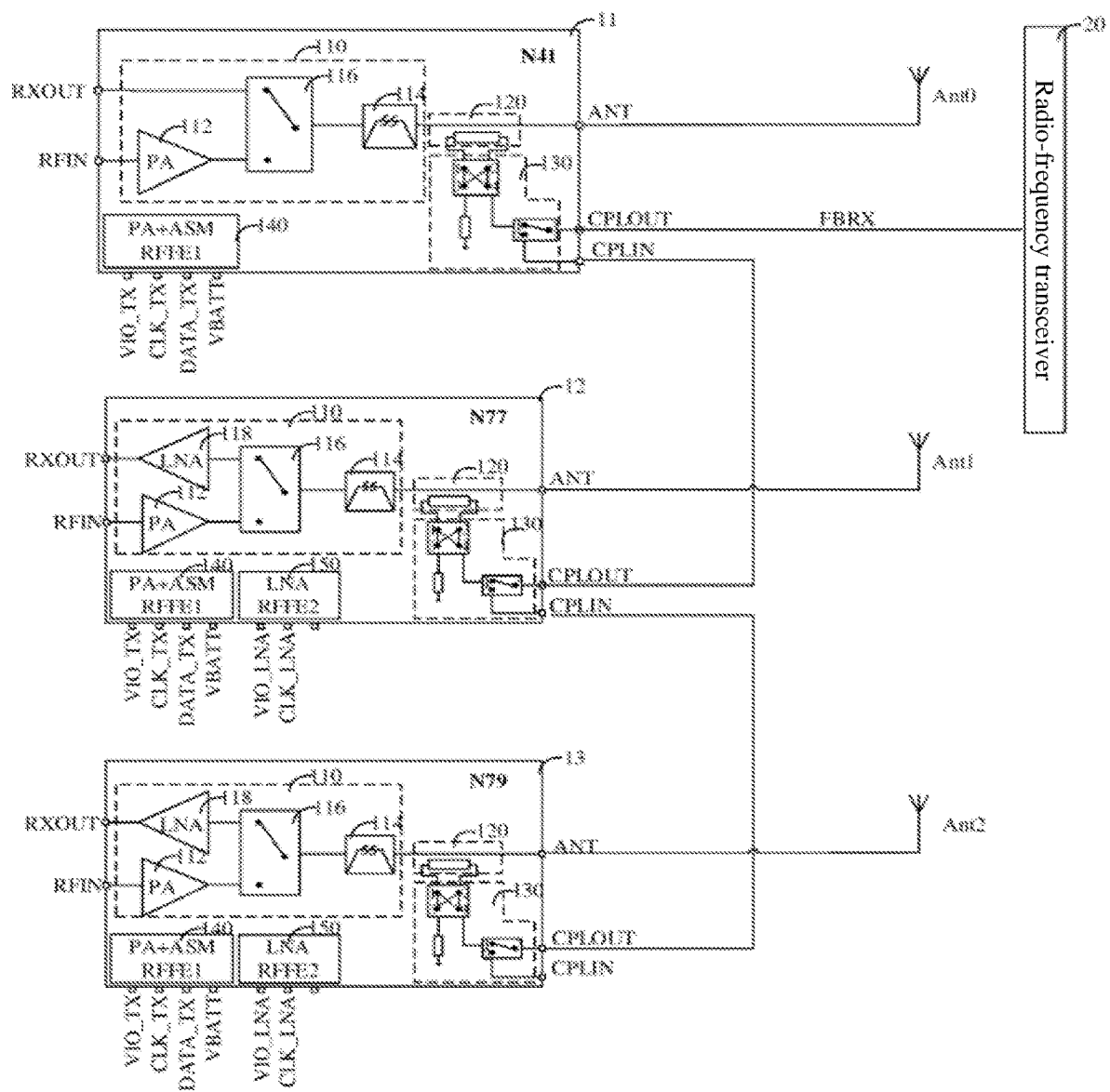
FIG. 11 is a first schematic structural diagram of a radio-frequency system according to an embodiment.
Figure 12:
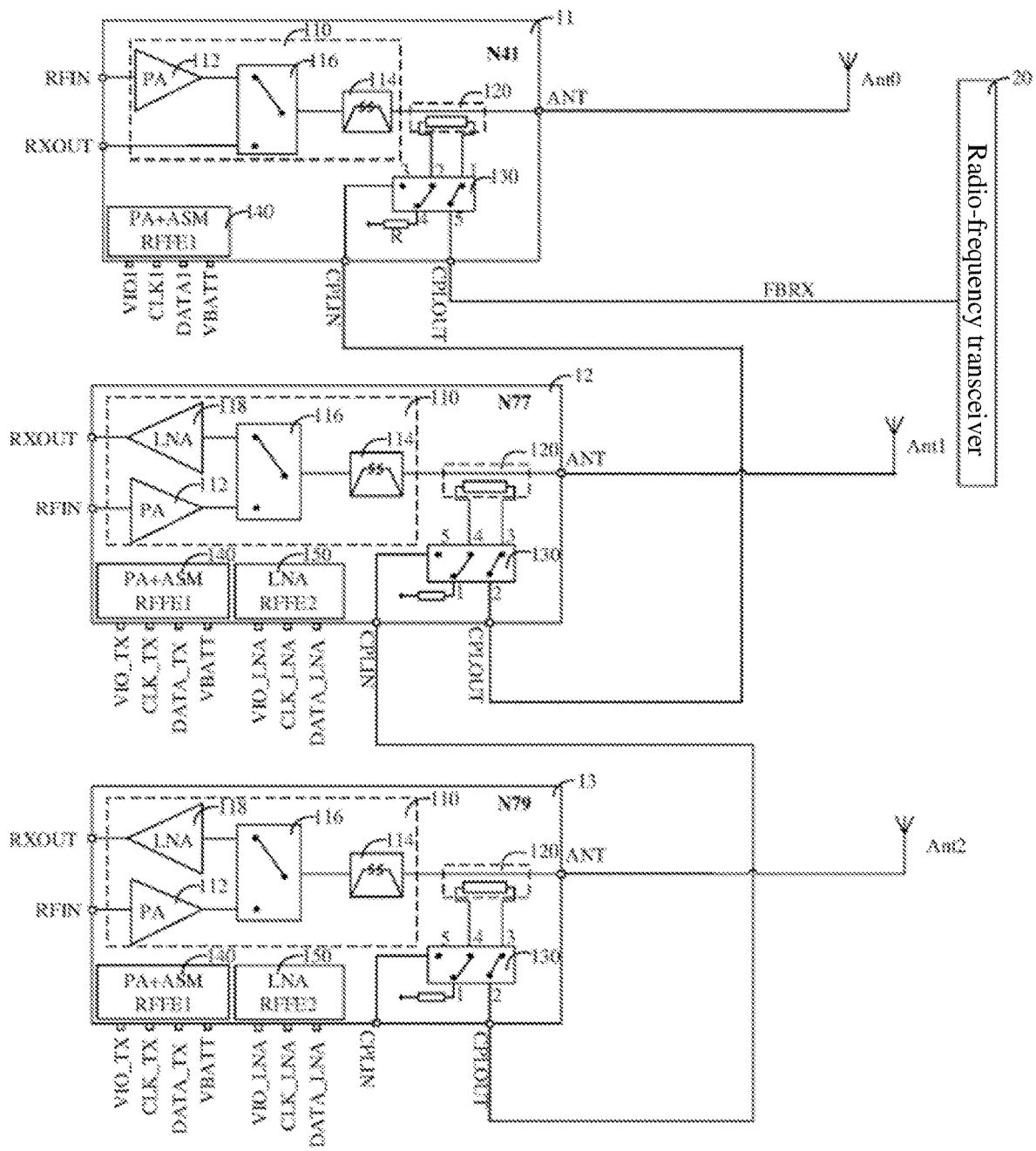
FIG. 12 is a second schematic structural diagram of a radio-frequency system according to an embodiment.

For example, an embodiment of the present disclosure further provides a radio-frequency system. As illustrated in FIG. 11 and FIG. 12, the radio-frequency system includes a radio-frequency transceiver 20, and a plurality of cascaded radio-frequency PA Mid devices. The plurality of radio-frequency PA Mid devices is the radio-frequency PA Mid device according to any of the above embodiments. Radio-frequency signals transceived by at least two of the plurality of radio-frequency PA Mid devices are in different frequency bands. The coupling output port CPLOUT of the radio-frequency PA Mid device of a lower stage is connected to the coupling input port CPLIN of the radio-frequency PA Mid device of an immediately upper stage. The coupling input port CPLIN of the radio-frequency PA Mid device of an uppermost stage is connected to the radio-frequency transceiver 20.

The radio-frequency PA Mid device of the upper stage and the radio-frequency PA Mid device of the immediately lower stage can be interpreted as two radio-frequency PA Mid devices that are connected to each other, e.g., two connected radio-frequency PA Mid devices. The coupling output port CPLOUT of the radio-frequency PA Mid device of the uppermost stage in the plurality of cascaded radio-frequency PA Mid devices is transmitted to the radio-frequency transceiver 20 via the feedback detection channel FBRX. The coupling output port CPLOUT of the radio-frequency PA Mid device of any other stage is connected to the coupling input port CPLIN of the radio-frequency PA Mid device of immediately upper stage relative to said stage. For example, when M radio-frequency PA Mid devices are provided, the 1-st radio-frequency PA Mid device can serve as the radio-frequency PA Mid device of the uppermost stage, and the M-th radio-frequency PA Mid device can serve as the radio-frequency PA Mid device of the lowermost stage. The coupling input port CPLIN of an i-th radio-frequency PA Mid device is connected to the coupling output port CPLOUT of an (i+1)-th radio-frequency PA Mid device. M is greater than or equal to 2, and i is greater than 1 and smaller than M. M and i are both positive integers.

A plurality of antennas Ant is connected to the antenna ports ANT of the radio-frequency PA Mid devices in one-to-one correspondence and is configured to transceive radio-frequency signals in a plurality of operating frequency bands. The number of the antennas Ant is equal to the number of the radio-frequency PA Mid devices. One antenna Ant is correspondingly connected to the antenna port ANT of one radio-frequency PA Mid device. Each antenna Ant can support the transceiving of radio-frequency signals in the 5G NR frequency band.

In an embodiment, the antenna Ant may be a directional antenna or a non-directional antenna. For example, the antenna Ant may be any suitable type of antenna. For example, the antenna Ant may be an antenna having a resonant element, formed in at least one of an array antenna structure, a loop antenna structure, a patch antenna structure, a slot antenna structure, a helical antenna structure, a strip antenna, a monopole antenna, or a dipole antenna. Different types of antennas Ant may be used for different frequency band combinations of radio-frequency signals.

Referring to FIG. 11 and FIG. 12, in an embodiment, the radio-frequency system includes a radio-frequency transceiver 20, a plurality of cascaded radio-frequency PA Mid devices, a first antenna Ant0, a second antenna Ant1, and a third antenna Ant2. The plurality of cascaded radio-frequency PA Mid devices include a first radio-frequency PA Mid device 11, a second radio-frequency PA Mid device 12, and a third radio-frequency PA Mid device 13.

The first radio-frequency PA Mid device 11 is configured to support transceiving of a first radio-frequency signal. A coupling output port CPLOUT of the first radio-frequency PA Mid device 11 is connected to the radio-frequency transceiver 20. An antenna port ANT of the first radio-frequency PA Mid device 11 is connected to the first antenna Ant0. The second radio-frequency PA Mid device 12 is configured to support transceiving of a second radio-frequency signal. A coupling output port CPLOUT of the second radio-frequency PA Mid device 12 is connected to a coupling input port CPLIN of the first radio-frequency PA Mid device 11. An antenna port ANT of the second radio-frequency PA Mid device 12 is connected to the second antenna Ant1. The third radio-frequency PA Mid device 13 is configured to support transceiving of a third radio-frequency signal. A coupling output port CPLOUT of the third radio-frequency PA Mid device 13 is connected to a coupling input port CPLIN of the second radio-frequency PA Mid device 12. An antenna port ANT of the third radio-frequency PA Mid device 13 is connected to the third antenna Ant2.

The coupling output port of the first radio-frequency PA Mid device 11 is configured to provide the radio-frequency transceiver 20 with feedback of the forward or reverse coupled signals of the first radio-frequency signal, the second radio-frequency signal, and the third radio-frequency signal.

For example, the first radio-frequency PA Mid device 11 can be interpreted as a radio-frequency PA Mid device configured to support the signals in the N41 frequency band; the second radio-frequency PA Mid device 12 can be interpreted as a radio-frequency PA Mid device configured to support the signals in the N77 frequency band; and the third radio-frequency PA Mid device 13 can be interpreted as a radio-frequency PA Mid device configured to support the signals in the N79 frequency band. It should also be understood that the first radio-frequency signal is an NR signal in the N41 frequency band, the second radio-frequency signal is an NR signal in the N77 frequency band, and the third radio-frequency signal is an NR signal in the N79 frequency band.

Based on the above first radio-frequency PA Mid device 11, second radio-frequency PA Mid device 12, and third radio-frequency PA Mid device 13 that are cascaded, channel configurations of the feedback detection channels FBRX are as shown in Table 2.

TABLE 2

Configurations of feedback detection channels FBRX of three-stage cascaded radio-frequency PA Mid devices

| Device | Path |
|---|---|
| First radio-frequency PA Mid device | Coupling output port CPLOUT |

TABLE 2-continued

Configurations of feedback detection channels FBRX of three-stage cascaded radio-frequency PA Mid devices

| Device | Path |
| --- | --- |
| Second radio-frequency PA Mid device | Coupling output port CPLOUT of second radio-frequency PA Mid device -> coupling input port CPLIN of first radio-frequency PA Mid device -> coupling output port CPLOUT of first radio-frequency PA Mid device |
| Third radio-frequency PA Mid device | Coupling output port CPLOUT of third radio-frequency PA Mid device -> coupling input port CPLIN of second radio-frequency PA Mid device -> coupling output port CPLOUT of second radio-frequency PA Mid device -> coupling input port CPLIN of first radio-frequency PA Mid device -> coupling output port CPLOUT of first radio-frequency PA Mid device |

The above radio-frequency system can achieve the transceiving control of the first radio-frequency signal, second radio-frequency signal, and third radio-frequency signal, as well as the power detection of the coupled signals of the first radio-frequency signal, second radio-frequency signal, and third radio-frequency signal. In the feedback detection channel FBRX of the radio-frequency system for the transmission of each radio-frequency signal, it is unnecessary to provide an additional switch for switching of different coupled signals. Instead, by means of the coupling switch 130, the coupling input port CPLIN, and the coupling output port CPLOUT of the plurality of cascaded radio-frequency PA Mid devices, different coupled signals can be outputted, via the coupling output port CPLOUT of the first radio-frequency PA Mid device 11, to the radio-frequency transceiver 20 through the feedback detection channel FBRX, thereby achieving the power detection of different coupled signals. In this way, the costs can be reduced, the isolation between respective radio-frequency PA Mid devices can be increased, and the space of a Printed Circuit Board (PCB) occupied by the radio-frequency system can also be saved. Meanwhile, the wiring lengths of the feedback detection channels FBRX of the second radio-frequency PA Mid device 12 and the third radio-frequency PA Mid device 13 can be shortened, which is conducive to optimizing the wiring of the PCB and can also reduce mutual interference between the feedback detection channels FBRX and interference with other radio-frequency lines.

Figure 13:
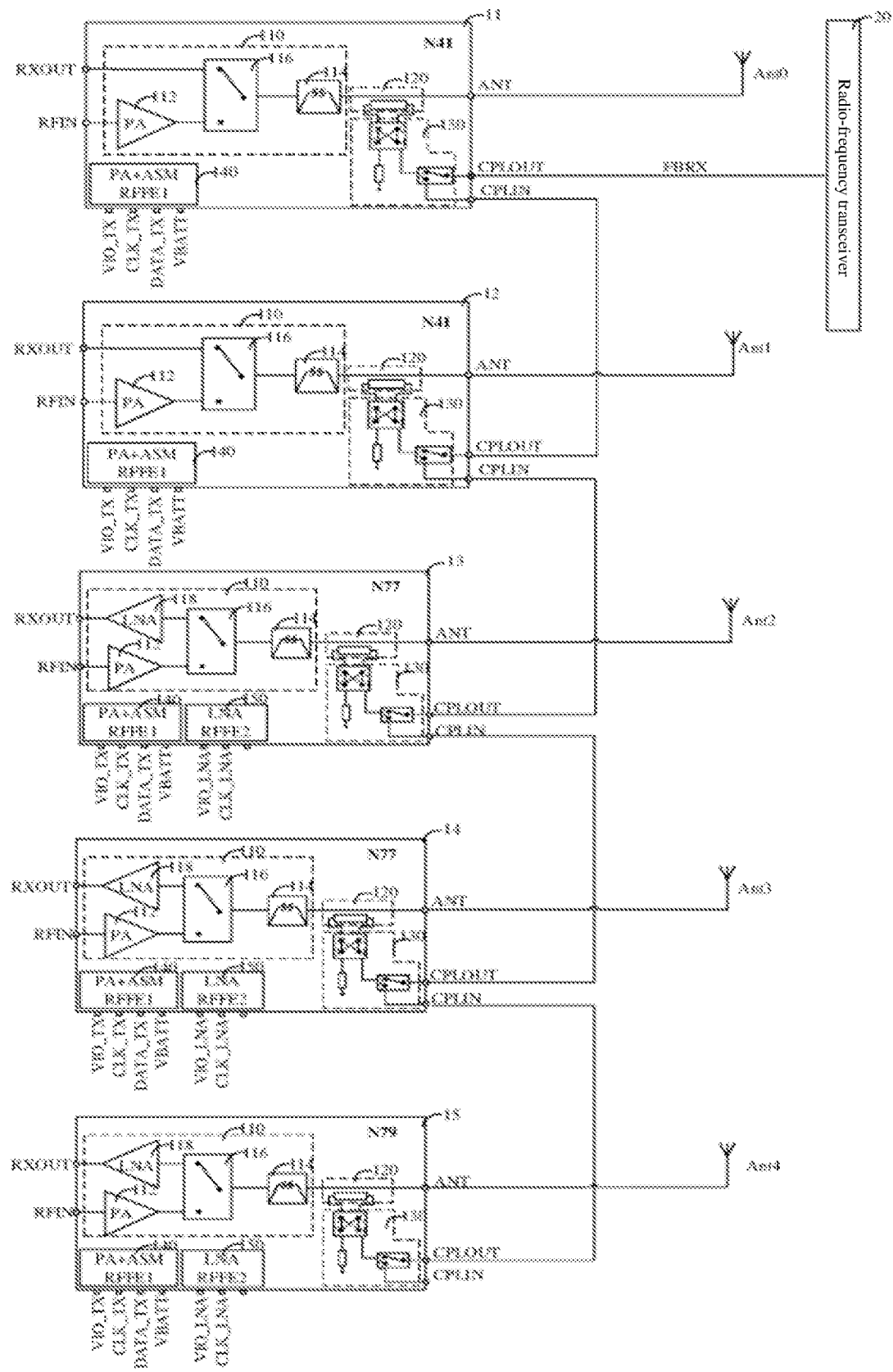
FIG. 13 is a third schematic structural diagram of a radio-frequency system according to an embodiment.
Figure 14:
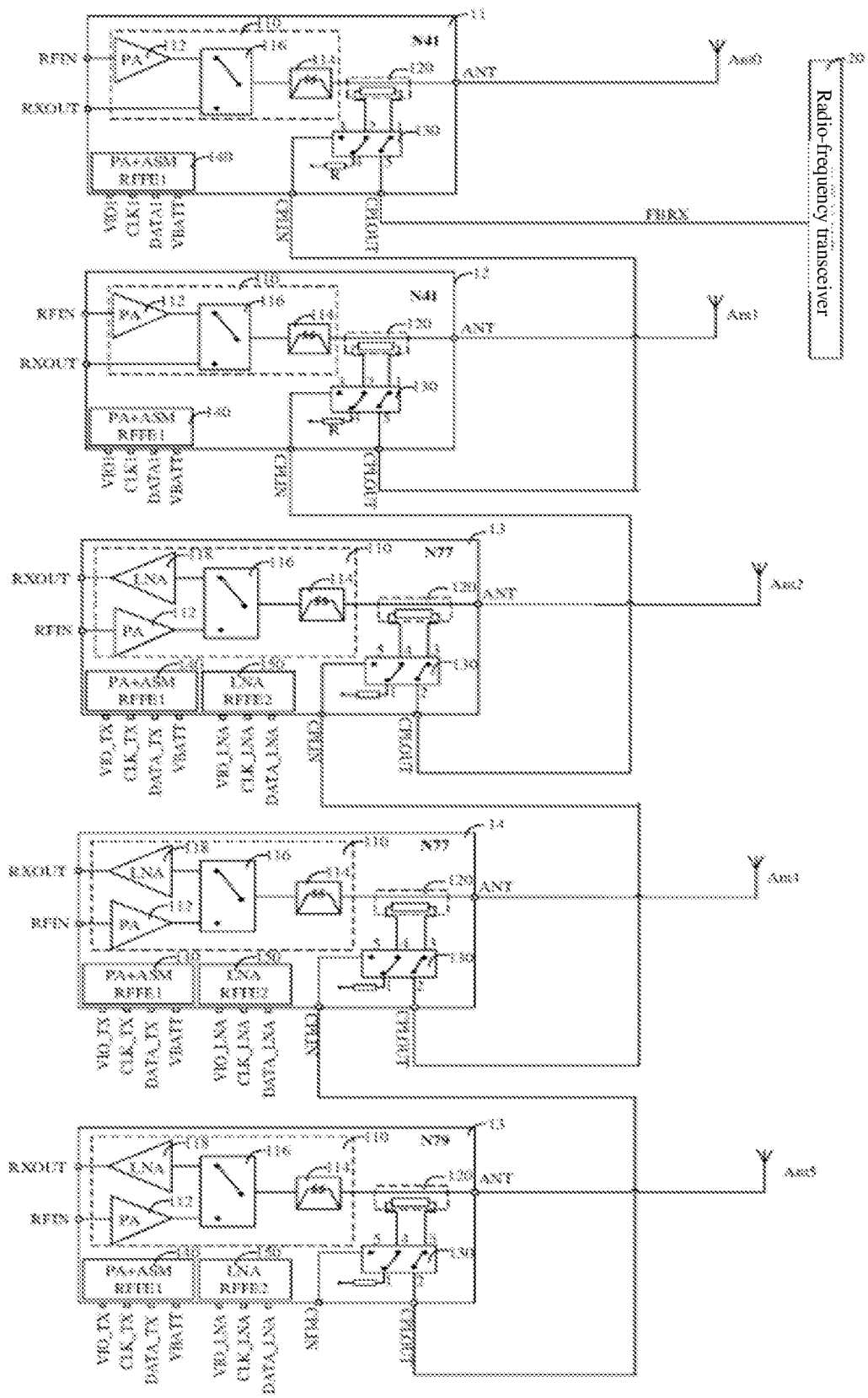
FIG. 14 is a fourth schematic structural diagram of a radio-frequency system according to an embodiment.

As illustrated in FIG. 13 and FIG. 14, in an embodiment, the radio-frequency system includes a radio-frequency transceiver 20, a plurality of cascaded radio-frequency PA Mid devices, a first antenna Ant0, a second antenna Ant1, a third antenna Ant2, a fourth antenna Ant3, and a fifth antenna Ant4. The plurality of cascaded radio-frequency PA Mid devices includes a first radio-frequency PA Mid device 11, a second radio-frequency PA Mid device 12, a third radio-frequency PA Mid device 13, a fourth radio-frequency PA Mid device 14, and a fifth radio-frequency PA Mid device 15. The first radio-frequency PA Mid device 11 and the second radio-frequency PA Mid device 12 are configured to support transceiving of the first radio-frequency signal. The coupling output port of the first radio-frequency PA Mid device 11 is connected to the radio-frequency transceiver 20. The coupling output port CPLOUT of the second radio-frequency PA Mid device 12 is connected to the coupling input port CPLIN of the first radio-frequency PA Mid device 11. The third radio-frequency PA Mid device 13 and the fourth radio-frequency PA Mid device 14 are configured to support transceiving of the second radio-frequency signal. The coupling output port CPLOUT of the third radio-frequency PA Mid device 13 is connected to the coupling input port CPLIN of the second radio-frequency PA Mid device 12. A coupling output port CPLOUT of the fourth radio-frequency PA Mid device 14 is connected to a coupling input port CPLIN of the third radio-frequency PA Mid device 13. The fifth radio-frequency PA Mid device 15 is configured to support transceiving of the third radio-frequency signal. A coupling output port CPLOUT of the fifth radio-frequency PA Mid device 15 is connected to a coupling input port CPLIN of the fourth radio-frequency PA Mid device 14.

The coupling output port of the first radio-frequency PA Mid device 11 is configured to provide the radio-frequency transceiver 20 with feedback of the forward or reverse coupled signals of the first radio-frequency signal, the second radio-frequency signal, and the third radio-frequency signal.

In an embodiment, the first radio-frequency PA Mid device 11 and the second radio-frequency PA Mid device 12 can be interpreted as radio-frequency PA Mid devices configured to support the signals in the N41 frequency band; the third radio-frequency PA Mid device 13 and the fourth radio-frequency PA Mid device 14 can be interpreted as radio-frequency PA Mid devices configured to support the signals in the N77 frequency band; and the fifth radio-frequency PA Mid device 15 can be interpreted as a radio-frequency PA Mid device configured to support the signals in the N79 frequency band. It should also be understood that the first radio-frequency signal is the NR signal in the N41 frequency band, the second radio-frequency signal is the NR signal in the N77 frequency band, and the third radio-frequency signal is the NR signal in the N79 frequency band.

Based on the above first radio-frequency PA Mid device 11, second radio-frequency PA Mid device 12, third radio-frequency PA Mid device 13, fourth radio-frequency PA Mid device 14, and fifth radio-frequency PA Mid device 15 that are cascaded, channel configurations of the feedback detection channels FBRX are as shown in Table 3.

TABLE 3

Configurations of feedback detection channels FBRX of five-stage cascaded radio-frequency PA Mid devices

| Device | Path |
| --- | --- |
| First radio-frequency PA Mid device | Coupling output port CPLOUT |
| Second radio-frequency PA Mid device | Coupling output port CPLOUT of second radio-frequency PA Mid device -> coupling input port CPLIN of first radio-frequency PA Mid device -> coupling output port CPLOUT of first radio-frequency PA Mid device |
| Third radio-frequency PA Mid device | Coupling output port CPLOUT of third radio-frequency PA Mid device -> coupling input port CPLIN of second radio-frequency PA Mid device -> coupling output port CPLOUT of second radio-frequency PA Mid device -> coupling input port CPLIN of first radio-frequency PA Mid device -> coupling output port CPLOUT of first radio-frequency PA Mid device |
| Fourth radio-frequency PA Mid device | Coupling output port CPLOUT of fourth radio-frequency PA Mid device -> coupling input port CPLIN of third radio-frequency PA Mid device -> coupling output port CPLOUT of third radio-frequency PA Mid device -> coupling input port CPLIN of second radio-frequency PA Mid device -> coupling output port CPLOUT of second radio-frequency PA Mid device -> coupling input port CPLIN of first radio-frequency PA Mid device -> |

TABLE 3-continued

Configurations of feedback detection channels FBRX of five-stage cascaded radio-frequency PA Mid devices

| Device | Path |
|---|---|
| Fifth radio-frequency PA Mid device | coupling output port CPLOUT of first radio-frequency PA Mid device<br>Coupling output port CPLOUT of fifth radio-frequency PA Mid device -> coupling input port CPLIN of fourth radio-frequency PA Mid device -> coupling output port CPLOUT of fourth radio-frequency PA Mid device -> coupling input port CPLIN of third radio-frequency PA Mid device -> coupling output port CPLOUT of third radio-frequency PA Mid device -> coupling input port CPLIN of second radio-frequency PA Mid device -> coupling output port CPLOUT of second radio-frequency PA Mid device -> coupling input port CPLIN of first radio-frequency PA Mid device -> coupling output port CPLOUT of first radio-frequency PA Mid device |

In the present embodiment of the present disclosure, by providing two first radio-frequency PA Mid devices 11 and two second radio-frequency PA Mid devices 12 in the radio-frequency system, a dual-frequency band (N41 and N77) and dual-channel Sounding Reference Signal (SRS) function can be supported, as well as a Non-Standalone (NSA) mode and a Standalone (SA) mode for simultaneous receiving of radio-frequency signals by the plurality of antennas Ant can also be supported. The above radio-frequency system can achieve the dual-channel transceiving control of the first and second radio-frequency signals as well as the transceiving control of the third radio-frequency signal. In the meantime, the power detection of the coupled signals of the first radio-frequency signal, second radio-frequency signal, and third radio-frequency signal can be also realized. In the feedback detection channel FBRX of the radio-frequency system for the transmission of each radio-frequency signal, it is unnecessary to provide an additional switch for switching of different coupled signals. Instead, by means of the coupling switch 130, the coupling input port CPLIN, and the coupling output port CPLOUT of the plurality of cascaded radio-frequency PA Mid devices, different coupled signals can be outputted, via the coupling output port CPLOUT of the first radio-frequency PA Mid device 11, to the radio-frequency transceiver 20 through the feedback detection channel FBRX, thereby achieving the power detection of different coupled signals. In this way, the costs can be reduced, the isolation between respective radio-frequency PA Mid devices can be increased, and the space of the PCB occupied by the radio-frequency system can be saved. Meanwhile, the wiring lengths of the feedback detection channels FBRX of the second radio-frequency PA Mid device 12 and the third radio-frequency PA Mid device 13 can be shortened, which is conducive to optimizing wiring of the PCB and can reduce mutual interference between the feedback detection channels FBRX and interference with other radio-frequency lines.

Figure 15:
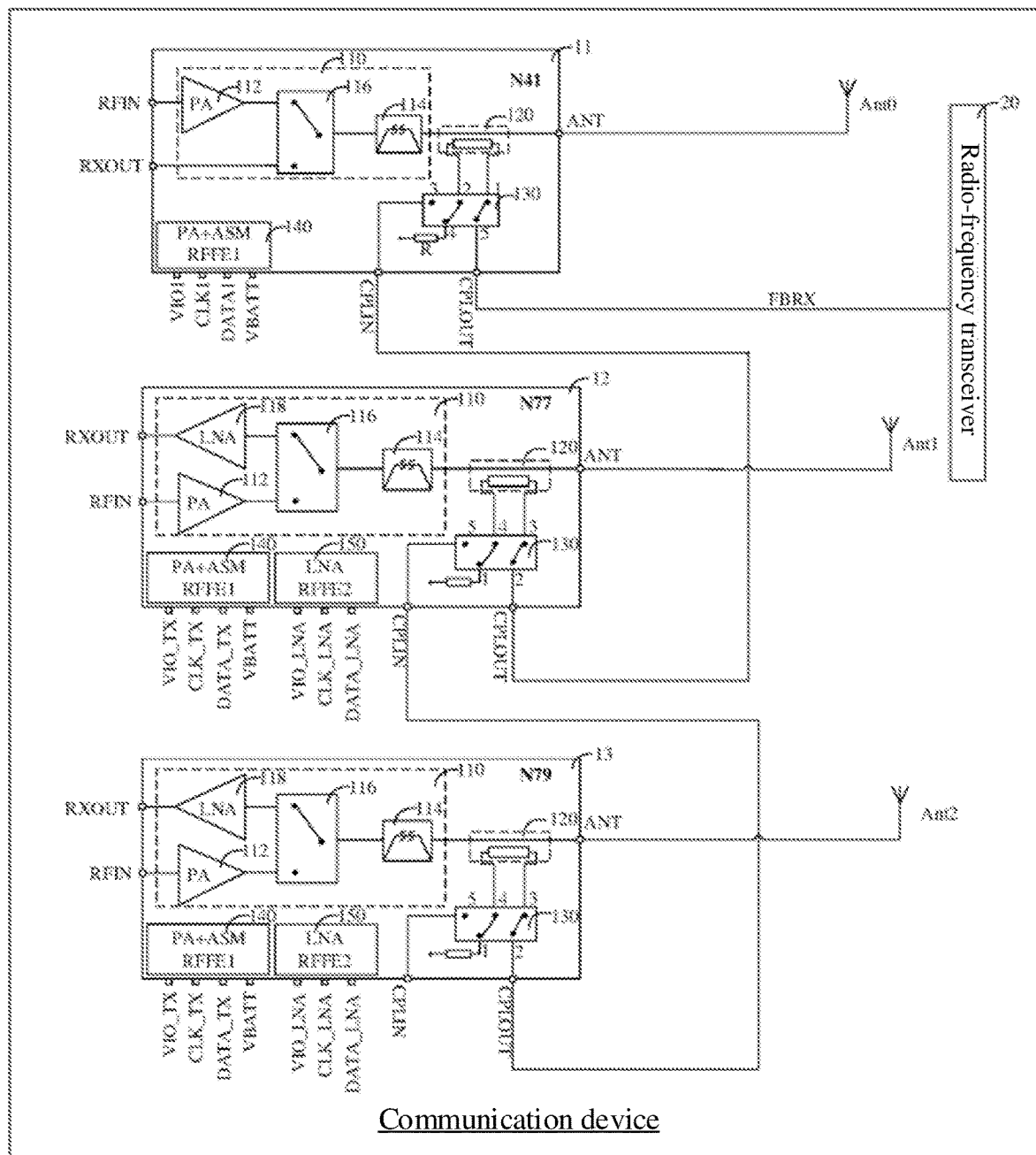
FIG. 15 is a schematic structural diagram of a communication apparatus according to an embodiment.

As illustrated in FIG. 15, an embodiment of the present disclosure further provides a communication device. The communication device includes the radio-frequency system according to any of the above embodiments. By disposing the radio-frequency system in the communication device, the power detection of different coupled signals can be realized. In this way, the costs can be reduced, the isolation between respective radio-frequency PA Mid devices can be increased, and the space of the PCB occupied by the radio-frequency system can be saved. Meanwhile, the wiring lengths of the feedback detection channels FBRX of the second radio-frequency PA Mid device 12 and the third radio-frequency PA Mid device 13 can be shortened, which is conducive to optimizing wiring of the PCB and can reduce mutual interference between the feedback detection channels FBRX and interference with other radio-frequency lines.

While several embodiments of the present disclosure are described above in a specific and detailed manner, the protection scope of the present disclosure cannot be construed as being limited to these embodiments. It should be noted that various variants and improvements can be made by those skilled in the art without departing from the concept of the present disclosure. These variants and improvements shall be encompassed by the protection scope of present disclosure as defined by the appended claims.

What is claimed is:

1. A radio-frequency Power Amplifier Modules including Duplexers (PA Mid) device, having a coupling output port, a coupling input port, and an antenna port configured to connect to an antenna, the radio-frequency PA Mid device comprising:
   a transceiving circuit connected to the antenna port and configured to support transceiving control of a radio-frequency signal;
   a coupling unit comprising:
      an input port coupled to the transceiving circuit;
      an output port coupled to the antenna port;
      a first coupling port configured to couple the radio-frequency signal and output a forward coupled signal; and
      a second coupling port configured to couple a reflected signal of the radio-frequency signal and output a reverse coupled signal; and
   a coupling switch connected to the first coupling port, the second coupling port, the coupling output port, and the coupling input port, wherein the coupling switch is configured to selectively output, via the coupling output port, the forward coupled signal, the reverse coupled signal, or an external coupled signal received via the coupling input port.

2. The radio-frequency PA Mid device according to claim 1, wherein the coupling switch comprises:
   a first switching unit connected to the first coupling port, the second coupling port, and a ground terminal; and
   a second switching unit connected to the first switching unit, the coupling input port, and the coupling output port.

3. The radio-frequency PA Mid device according to claim 2, wherein:
   the first switching unit is a radio-frequency Double Pole Double Throw (DPDT) switch; and
   the second switching unit is a radio-frequency Single Pole Double Throw (SPDT) switch.

4. The radio-frequency PA Mid device according to claim 2, further comprising a resistor, wherein the coupling switch is grounded via the resistor to release the forward coupled signal or the reverse coupled signal.

5. The radio-frequency PA Mid device according to claim 1, wherein:
   the coupling switch comprises a plurality of first terminals and two second terminals;
   one first terminal of the plurality of first terminals is connected to the first coupling port;
   another first terminal of the plurality of first terminals is connected to the second coupling port;

yet another first terminal of the plurality of first terminals is connected to the coupling input port;
one of the two second terminals is connected to the coupling output port; and
the other one of the two second terminals is grounded.

6. The radio-frequency PA Mid device according to claim 5, wherein the coupling switch is a radio-frequency Double Pole Five Throw (DP5T) switch.

7. The radio-frequency PA Mid device according to claim 5, further comprising a resistor, wherein the coupling switch is grounded via the resistor to release the forward coupled signal or the reverse coupled signal.

8. The radio-frequency PA Mid device according to claim 1, wherein the coupling unit comprises a first directional coupler and a second directional coupler that are connected in reverse series.

9. The radio-frequency PA Mid device according to claim 1, further having a receiving port and a transmitting port, wherein the transceiving circuit comprises:
a power amplifier having an input terminal connected to the transmitting port, the power amplifier being configured to receive the radio-frequency signal via the transmitting port and amplify the received radio-frequency signal;
a filter coupled to the first coupling port of the coupling unit, the filter being configured to perform a filtering processing the received radio-frequency signal; and
a third switching unit connected to an output terminal of the power amplifier, the receiving port and the filter, the third switching unit being configured to selectively switch on a receiving channel where the receiving port is located and a transmitting channel where the transmitting port is located.

10. The radio-frequency PA Mid device according to claim 9, wherein the transceiving circuit further comprises:
a low noise amplifier having an input terminal connected to the third switching unit and an output terminal connected to the receiving port, the low noise amplifier being configured to amplify the received radio-frequency signal.

11. The radio-frequency PA Mid device according to claim 9, wherein the filter is a low-pass filter or a band-pass filter.

12. The radio-frequency PA Mid device according to claim 1, wherein the radio-frequency signal is a 5-th Generation Mobile Communication Technology (5G) signal in an N41 frequency band, an N77 frequency band, or an N79 frequency band.

13. A radio-frequency system, comprising:
a radio-frequency transceiver;
a plurality of cascaded radio-frequency PA Mid devices, wherein radio-frequency signals transceived by at least two of the plurality of radio-frequency PA Mid devices are in different frequency bands, wherein the coupling output port of the radio-frequency PA Mid device of a lower stage is connected to the coupling input port of the radio-frequency PA Mid device of an immediately upper stage, and wherein the coupling input port of the radio-frequency PA Mid device of an uppermost stage is connected to the radio-frequency transceiver; and
a plurality of antennas connected to the antenna ports of the plurality of radio-frequency PA Mid devices in a one-to-one correspondence, the plurality of antennas being configured to transceive radio-frequency signals in a plurality of different operating frequency bands, wherein:
each of the plurality of cascaded radio-frequency PA Mid devices has a coupling output port, a coupling input port, and an antenna port configured to connect to an antenna, and each of the plurality of radio-frequency PA Mid devices comprises:
a transceiving circuit connected to the antenna port and configured to support transceiving control of a radio-frequency signal;
a coupling unit comprising:
an input port coupled to the transceiving circuit;
an output port coupled to the antenna port;
a first coupling port configured to couple the radio-frequency signal and output a forward coupled signal; and
a second coupling port configured to couple a reflected signal of the radio-frequency signal and output a reverse coupled signal; and
a coupling switch connected to the first coupling port, the second coupling port, the coupling output port, and the coupling input port, wherein the coupling switch is configured to selectively output, via the coupling output port, the forward coupled signal, the reverse coupled signal, or an external coupled signal received via the coupling input port.

14. The radio-frequency system according to claim 13, wherein:
the plurality of cascaded radio-frequency PA Mid devices comprises a first radio-frequency PA Mid device, a second radio-frequency PA Mid device, and a third radio-frequency PA Mid device;
the first radio-frequency PA Mid device is configured to support transceiving of a first radio-frequency signal, a coupling output port of the first radio-frequency PA Mid device being connected to the radio-frequency transceiver;
the second radio-frequency PA Mid device is configured to support transceiving of a second radio-frequency signal, a coupling output port of the second radio-frequency PA Mid device being connected to a coupling input port of the first radio-frequency PA Mid device;
the third radio-frequency PA Mid device is configured to support transceiving of a third radio-frequency signal, a coupling output port of the third radio-frequency PA Mid device being connected to a coupling input port of the second radio-frequency PA Mid device; and
the coupling output port of the first radio-frequency PA Mid device is configured to provide the radio-frequency transceiver with feedback of forward or reverse coupled signals of the first radio-frequency signal, the second radio-frequency signal, and the third radio-frequency signal.

15. The radio-frequency system according to claim 14, wherein:
the first radio-frequency signal is a 5G signal in an N41 frequency band;
the second radio-frequency signal is a 5G signal in an N77 frequency band; and
the third radio-frequency signal is a 5G signal in an N79 frequency band.

16. The radio-frequency system according to claim 13, wherein:
the plurality of cascaded radio-frequency PA Mid devices comprises a first radio-frequency PA Mid device, a second radio-frequency PA Mid device, a third radio-frequency PA Mid device, a fourth radio-frequency PA Mid device, and a fifth radio-frequency PA Mid device;

the first radio-frequency PA Mid device and the second radio-frequency PA Mid device are configured to support transceiving of a first radio-frequency signal, a coupling output port of the first radio-frequency PA Mid device being connected to the radio-frequency transceiver, and a coupling output port of the second radio-frequency PA Mid device being connected to a coupling input port of the first radio-frequency PA Mid device;

the third radio-frequency PA Mid device and the fourth radio-frequency PA Mid device are configured to support transceiving of a second radio-frequency signal, a coupling output port of the third radio-frequency PA Mid device being connected to a coupling input port of the second radio-frequency PA Mid device, and a coupling output port of the fourth radio-frequency PA Mid device being connected to a coupling input port of the third radio-frequency PA Mid device;

the fifth radio-frequency PA Mid device is configured to support transceiving of a third radio-frequency signal, a coupling output port of the fifth radio-frequency PA Mid device being connected to a coupling input port of the fourth radio-frequency PA Mid device; and the coupling output port of the first radio-frequency PA Mid device is configured to provide the radio-frequency transceiver with feedback of forward or reverse coupled signals of the first radio-frequency signal, the second radio-frequency signal, and the third radio-frequency signal.

17. The radio-frequency system according to claim 15, wherein:

the first radio-frequency signal is a 5G signal in an N41 frequency band;

the second radio-frequency signal is a 5G signal in an N77 frequency band; and the third radio-frequency signal is a 5G signal in an N79 frequency band.

18. A communication device, comprising a radio-frequency system, the radio-frequency system comprising:

a radio-frequency transceiver;

a plurality of cascaded radio-frequency PA Mid devices, wherein radio-frequency signals transceived by at least two of the plurality of radio-frequency PA Mid devices are in different frequency bands, wherein the coupling output port of the radio-frequency PA Mid device of a lower stage is connected to the coupling input port of the radio-frequency PA Mid device of an immediately upper stage, and wherein the coupling input port of the radio-frequency PA Mid device of an uppermost stage is connected to the radio-frequency transceiver; and a plurality of antennas connected to the antenna ports of the plurality of radio-frequency PA Mid devices in a one-to-one correspondence, the plurality of antennas being configured to transceive radio-frequency signals in a plurality of different operating frequency bands, wherein:

each of the plurality of cascaded radio-frequency PA Mid devices has a coupling output port, a coupling input port, and an antenna port configured to connect to an antenna, and each of the plurality of radio-frequency PA Mid devices comprises:

a transceiving circuit connected to the antenna port and configured to support transceiving control of a radio-frequency signal;

a coupling unit comprising:
　　an input port coupled to the transceiving circuit;
　　an output port coupled to the antenna port;
　　a first coupling port configured to couple the radio-frequency signal and output a forward coupled signal; and
　　a second coupling port configured to couple a reflected signal of the radio-frequency signal and output a reverse coupled signal; and a coupling switch connected to the first coupling port, the second coupling port, the coupling output port, and the coupling input port, wherein the coupling switch is configured to selectively output, via the coupling output port, the forward coupled signal, the reverse coupled signal, or an external coupled signal received via the coupling input port.

* * * * *